3,280,201
PROCESS OF MAKING 2,6-DISUBSTITUTED PHENOLS
Stephen B. Hamilton and Allan S. Hay, Schenectady, N.Y., assignors to General Electric Company, a corporation of New York
No Drawing. Filed Dec. 31, 1962, Ser. No. 248,189
20 Claims. (Cl. 260—621)

The present invention relates to the process for producing 2,6-dialkyl-substituted phenols and more particularly to the production of 2,6-dimethylphenol, 2-ethyl-6-methylphenol, and 2,6-diethylphenol by a process which comprises reacting either formaldehyde or acetaldehyde with cyclohexanone or 2-methylcyclohexanone in the vapor phase at a temperature of from 200° to 800° C.

Ordinarily, alkylphenols are prepared synthetically by the reaction of an alkylating agent on a lower phenol homologue, for example phenol or cresol, in the vapor phase using various catalysts to increase the yield. However, when 2,6-xylenol is the desired product, many of the alkylating agents, e.g., alkenes, cannot be used. When an alkylating agent such as methanol is used, the conversions of phenol to the dialkyl phenol are usually low and the dialkyl phenol product produced is a mixture of the 2,6-isomer and the other possible isomers, e.g., the 2,4-isomer, etc., which are difficult to separate.

The vapor phase reaction of formaldehyde with ketones usually produces unsaturated materials which readily polymerize when pure.

We have unexpectedly discovered that 2,6-xylenol, 2-ethyl-6-methylphenol, or 2,6-diethylphenol are produced when formaldehyde or acetaldehyde is mixed with cyclohexaneone or 2-methylcyclohexanone and reacted in the vapor phase at a temperature of 200°–800° C. Surprisingly, we have found that this reaction occurs even in the absence of a catalyst and that little, if any, of the 2,4-isomers are formed. We have likewise found that there are many materials which when used to pack the column, aid in increasing the conversion of the starting materials and the yield of the 2,6-substituted phenol. Since many of the materials are known to possess catalytic activity for other types of reactions, they no doubt also likewise act as catalysts in our reaction. However, the spectrum of materials that may be used to pack the reaction tube is so wide that it appears that some of the contribution of these materials in aiding our reaction may be entirely due to their functioning as heat transfer agents.

To produce 2,6-dimethylphenol, also known as 2,6-xylenol, by our reaction, formaldehyde is reacted either with cyclohexanone or 2-methylcyclohexanone. If 2,6-diethylphenol is the desired product, acetaldehyde is reacted with cyclohexanone, while 2-ethyl-6-methylphenol can be obtained from 2-methylcyclohexanone and acetaldehyde.

In carrying out our reactions, it is only necessary to vaporize the reactants and pass them through a hot tube heated to a temperature of 200°–800° C. This tube may be made of any suitable material which does not cause carbonization of the reactants or products, e.g., metals (for example, nickel, stainless steel), glass, quartz, ceramics, etc. In the absence of the packing, temperatures in the high end of the range are preferred to give the best yield per pass through the reactor. Unreacted materials can be recovered and recycled to increase the yield based on materials consumed.

The formaldehyde and acetaldehyde can be used either in the form of aqueous solutions or in the form of vapor obtained by depolymerizing of their polymers, e.g., trioxane, paraform, paraldehyde, etc. In those cases where a solid is used to pack the reaction tube which can dehydrogenate cyclohexanol to cyclohexanone, 2-methylcyclohexanol to 2-methylcyclohexanone, methanol to formaldehyde and ethanol to acetaldehyde, many of which are known, e.g., ZnO, etc., we have found that the ketone or aldehyde is produced in situ and reacts to produce the desired 2,6-dialkyl phenols in the same way as when cyclohexanone, 2-methylcyclohexanone, formaldehyde, or acetaldehyde is used as the starting material. This is a desirable feature since, for example, it permits the use of mixtures such as the mixture of cyclohexanone and cyclohexanol obtained by the oxidation of cyclohexanone to be used in our reaction.

Although the reaction proceeds in the absence of a packed bed, the quantity of cyclohexanone or methylcyclohexanone which can be converted to the 2,6-dialkylphenol per pass through a given reaction zone can be materially increased by packing the reaction zone with a wide variety of inorganic solid materials which are stable at the temperature of the reaction. Materials which we have found satisfactory for packing of the reaction zone to increase the yield are refractory solids, e.g., carborundum, glasses, stone, steatites, porcelains, fired clays, etc., any of the metallic oxides, halides, sulfates, sulfides, silicates, carbonates, phosphates, etc., which are thermally stable at the reaction temperature. The metal moiety of these latter compounds may be any metal, for example, the metals of Groups IA, IIA and B, IIIA and B, IVA and B, VA and B, VIB, VIIB, and VIII of the Periodic Chart of the Elements. Carbonates, basic carbonates, oxalates, formates, etc., of these metals which are thermally unstable may be used since they thermally decompose at the temperature of the reaction to form the oxides. Mixtures of these materials as well as these materials deposited on refractory supporting structures, e.g., pumice stone, various ceramics, glasses, quartz, etc., may also be used. Because of their ready availability and because they are very effective in increasing the yield and amount of starting materials converted to the desired 2,6-dialkylphenol, we prefer to use the phosphates, oxides and silicates of calcium, zinc, magnesium and aluminum. Calcium phosphate and especially calcium phosphate deposited on bone black appears to be extremely active packing material to use for our reaction.

In the by-products of our reaction we have found partially reacted materials which are not alkali-soluble as well as ortho-cresol or 2-ethylphenol. We have found that these partially reacted materials, including ortho-cresol and 2-ethylphenol, may be recycled in the reaction, along with recovered cyclohexanone. However, if desired, the ortho-cresol and 2-ethylphenol may be separated and used since they are useful products themselves, e.g., as reactants for making phenolic resins.

The vapor phase reaction may be carried out at atmospheric, subatmospheric or superatmospheric pressure. However, we have found that carrying out the vapor phase reaction, at a reduced pressure in the range of from 10 mm. mercury to atmospheric pressure, increases the yield. Preferably, the reaction is carried out in the range of 10 to 40 mm. pressure.

In the reaction of cyclohexanone with either formaldehyde or acetaldehyde to produce the corresponding 2,6-dialkylphenol, 2 moles of the aldehyde are required for each mole of ketone. When formaldehyde or acetaldehyde is reacted with 2-methylcyclohexanone to form the 2,6-dialkylphenol, only one mole of aldehyde is required per mole of ketone. In general, we prefer to use the aldehyde in at least the required molar proportions, since the use of less than the required molar amount of aldehyde gives no beneficial effect and decreases the yield. While an increase over the require amount would be expected to cause the production of a higher amount of by-product tri- and higher alkylphenols, we have not noticed this effect. In fact, using ratios as high as 4 moles of aldehyde to one mole of ketone has not increased the yield of higher alkylated phenols and has actually increased the yield of the 2,6-dialkylphenol.

Even though the reactants are introduced in the proper molar proportions, we have noted that two of the by-products are both monoalkylated phenol, i.e., ortho-cresol and 2-ethylphenol, and also, the trialkylated phenols, e.g., mesitol and 2,4,6-triethylphenol. Our investigation indicates that the trialkylated phenols do not arise by the reaction of the dialkylated phenol with additional aldehyde but by the disproportionation of 2 moles of the dialkylated phenol into one mole of monoalkylated phenol and one mole of trialkylated phenol. This disproportionation reaction is favored by higher temperatures of reaction and also by longer contact time of the reactants in the reaction zone. However, since too low a temperature and too short a contact time would affect the overall yield of the dialkylated phenol, we generally optimize both the contact time and the temperature of the reaction to give the greatest yield of dialkylated phenol, which is the desired product of our reaction.

The general procedures for the vapor phase reactions of the following examples were carried out in either a quartz or Pyrex glass tube, 28 inches long x 1 inch in diameter, which is surrounded by an electric furnace controlled to give the desired temperature. The tube is inclined slightly from horizontal with the reactants being introduced at the right end of the tube. The lower end of the tube is equipped with a condenser and a cooled receiver and vapor trap with proper provisions for drawing a vaccum on the system. In general, both the aldehyde and ketone are mixed to form a homogeneous solution which is introduced at a controlled rate into the reaction vessel, where it immediately vaporizes on contacting the hot surface. This caused a slight amount of resin to form in the hot liquid phase, but this can be eliminated by separately vaporizing the reactants and mixing the vapors. Where the tube is packed with an inorganic solid, the entire tube is filled except for the last two inches of each end, except in those cases as noted.

In order that those skilled in the art may better understand our invention, the following examples are given which are illustrative of the practice of our invention, and are not intended for purposes of limitation. In the examples, all parts are by weight unless otherwise stated.

EXAMPLE 1

A solution of 20 ml. of cyclohexanone in 60 ml. of aqueous formaldehyde (molar ratio 3.2 moles of formaldehyde to 1 mole of cyclohexanone) was introduced dropwise over a period of 2 hours into an empty quartz tube heated to 800° C. and evacuated to a pressure of 0.5 mm. of mercury. The product which was collected separated into an aqueous and an organic layer which were separated and the aqueous layer extracted with ether, and added to the organic layer. After drying the organic layer with a desiccant, the ether was evaporated and the residue fractionally distilled. The organic layer was found to contain 3.4 percent 2,6-xylenol based on the cyclohexanone feed. The 2,6-xylenol gave no depression of melting point when mixed with an authentic sample of 2,6-xylenol. The balance of the distillate was mostly cyclohexanone with trace amounts of ortho-cresol and mesitol. 2-methylcyclohexanone yields similar results.

The following Example 2 illustrates the benefit of packing the column with an inorganic solid, specifically calcium phosphate deposited on animal charcoal, which was prepared as follows. A solution of 4 grams of tricalcium phosphate in 300 ml. of formic acid was used to soak 360 grams of animal charcoal for 12 hours after which the mixture was evaporated to dryness in a vacuum oven at 125° C. and 12 mm. pressure. This material was used to fill a pyrex glass reaction tube as described in the general method. The apparatus was evacuated to 12 mm. pressure and then a flow of nitrogen gas was admitted to adjust the pressure to 20 mm.

EXAMPLE 2

A solution of 98.1 grams of cyclohexanone in 250 ml. of aqueous formaldehyde containing 3.26 moles of formaldehyde was added dropwise at the rate of 50 ml./hr. to the reaction apparatus heated to 350° C. described in the general method. The liquid products which condensed in the receiver and vacuum trap were combined and the aqueous layer separated from the organic layer. After the organic layer was dried over anhydrous magnesium sulfate and filtered, it weighed 120.2 grams. This product was steam distilled in order to separate any polymeric material to give 116.5 grams which contained 64.5% 2,6-xylenol, 12.5% mesitol and 7.7% ortho-cresol. The balance of the material was unconverted cyclohexanone and intermediate reaction products which could be recycled to produced more of the desired 2,6-xylenol.

EXAMPLE 3

Example 2 was repeated, except that the reaction was carried out at atmospheric pressure. Under these conditions, aqueous formaldehyde gave a final product containing 50% 2,6-xylenol, 14.9% mesitol, and 16.7% ortho-cresol. When trioxane, para-formaldehyde and acetaldehyde were used as the source of aldehyde under the same conditions, but using 3 moles of the aldehyde to 1 mole of cyclohexanone, the product from para-formaldehyde contained 35.1% 2,6-xylenol, 18% mesitol, and 28.5% ortho-cresol. This reaction was carried out at 360° rather than 350°. The yield from trioxane at 350° C. was 40% 2,6-xylenol, 34% mesitol and 8.6% ortho-cresol. The yield from acetaldehyde at 350° C. was 3% diethylphenol and 33% 2-ethylphenol. In carrying out the reactions with trioxane and para-formaldehyde, a modification was made in that the solution of cyclohexanone and the para-formaldehyde or trioxane was volatilized by dropping it into a flask heated at 250° C. and vapors then introduced directly into the reaction apparatus described in the general method.

The results of Example 3 when compared to those of Example 2 show that polymers of the aldehydes may be used in place of the monomeric aldehydes but that better yields are obtained from the monomeric aldehydes. This could be due to the fact that the water in the aqueous formaldehyde has a beneficial effect. The results also show that higher yields are favored by carrying out the reaction at a pressure less than atmospheric. However, these results could be due to the fact that at the lower pressures there is a short residence time of the reactants in the reaction zone, an effect which is shown in the following example.

EXAMPLE 4

In Example 3, the reaction time when aqueous formaldehyde was used was calculated and found to be $3.10 \times 10^{-2}$ seconds. In order to shorten the reaction time, this example was repeated with aqueous formaldehyde but carrying out the reaction at 20 mm. pressure to give a reaction time of $6.57 \times 10^{-4}$ seconds. The example was also repeated in which the reaction tube was only filled to 40% of its length with the animal charcoal coated with calcium phosphate and the reaction run both at atmospheric pressure and at 12 mm. pressure to give reaction times of $1.55 \times 10^{-2}$ seconds and $3.28 \times 10^{-4}$ seconds, respectively. The results are shown in the following table.

Table I

| Reaction Time (sec.) | Percent in Final Product | | |
| --- | --- | --- | --- |
| | 2,6-Xylenol | 2,4,6-Mesitol | o-Cresol |
| $3.28 \times 10^{-4}$ | 56.0 | 12.0 | 12.4 |
| $6.57 \times 10^{-4}$ | 61.5 | 10.7 | 8.4 |
| $1.55 \times 10^{-2}$ | 54.0 | 22.0 | 8.7 |
| $3.10 \times 10^{-2}$ | 50.0 | 14.9 | 16.7 |

EXAMPLE 5

The effect of varying the molar ratios of formaldehyde to cyclohexanone was investigated using aluminum oxide as the packing for the reaction zone. The reaction was carried out at atmospheric pressure and at a temperature of 300° C. Ratio of 1.5, 2, 2.5 and 4 moles of formaldehyde to 1 mole of cyclohexanone were studied. There was a slightly higher yield of 2,6-xylenol in the run using a 4:1 ratio, but this was to be expected since the rate of addition was constant in all of the runs and the higher ratio of formaldehyde to cyclohexanone under these conditions gives a higher space velocity through the reaction zone and therefore a shorter reaction time, which favors a higher yield as demonstrated above. A run was also made with this packing, using reduced pressure of 40 mm., which also showed a higher yield of 2,6-xylenol as would be expected from the previous examples. Several runs were also made at atmospheric pressure using 2-methylcyclohexanone in place of the cyclohexanone. Also, a run was made in which methanol was used in place of formaldehyde with the reaction being carried out at atmospheric pressure at a temperature of 300° C. In the reactions using aluminum oxide as the packing for the reaction tube, the yields were in the range of 20 to 25% 2,6-xylenol, 5% mesitol and 10% ortho-cresol.

EXAMPLE 6

In addition to the use of the inorganic solids as packing materials in the above examples, as a wide variety of inorganic solids may be used, for example, pumice stone, animal charcoal, which as produced contains at least 70% calcium phosphate, glass helices, zinc oxide, magnesium oxide, calcium oxide, magnesium silicate, calcium silicate, zinc silicate, magnesium silicate, aluminum silicate, zinc phosphate, magnesium phosphate, aluminum phosphate, as well as coated and mixed solids, e.g., glass helices coated with strontium carbonate, coconut charcoal treated with calcium phosphate, pumice stone treated with calcium phosphate, bone black treated with sodium phosphate, animal charcoal treated with calcium phosphate mixed with glass helices, etc. All of these materials are satisfactory packing materials for carrying out our vapor phase reaction of formaldehyde or acetaldehyde with either cyclohexanone or 2-methylcyclohexanone.

Typical results obtained with some of these materials are shown in the following Table II. The first four reactions were carried out at 350° C. at atmospheric pressure with the ratio being 2.5 moles of formaldehyde to 1 mole of cyclohexanone. The last two reactions were carried out at the same temperature but at 20 mm. pressure with the ratio being 3.26 moles of formaldehyde to one mole of cyclohexanone.

*Table II*

| Catalyst | Percent in Final Product | | |
|---|---|---|---|
| | 2,6-Xylenol | Mesitol | o-Cresol |
| Animal Charcoal [1] | 37.2 | 15.0 | 11.2 |
| $Ca_3(PO_4)_2$-Pumice Stone | 25.9 | 15.1 | 22.7 |
| $Ca_3(PO_4)_2$-Coconut Charcoal | 38.6 | 1.6 | 55.5 |
| $SrCO_3$-Glass Helices | 20 | 10 | 10 |
| $Na_3PO_4$-Animal Charcoal | 47.6 | 14.6 | 13.5 |
| $Na_3PO_4$-$Ca_3(PO_4)_2$-Animal Charcoal | 44.4 | 18.7 | 16.0 |

[1] Repeating this run but using a solution of cyclohexanone and formaldehyde saturated with trimethylamine increased the proportion of xylenol in the phenolic products from 58% to 76% with corresponding decreases in the o-cresol and mesitol.

The 2,6-xylenol produced by our reaction may be used in any of the known reactions where 2,6-xylenol, for example, synthetic or recovered from coal tar, previously has been used, for example, in the preparation of chemical compounds, etc. It has particular utility in the preparation of diphenoquinones and polyphenylene ethers, e.g., poly(2,6-dimethylphenylene ether) and poly(2,6-diethylphenyleneether), etc., as disclosed in the copending application of Hay, Serial No. 212,128, filed July 24, 1962, and assigned to the same assignee as the present invention.

Obviously, other modifications and variations of the present invention are possible in light of the above teachings. It is therefore to be understood that changes may be made in the particular embodiments of the invention described which are within the full intended scope of the invention as defined by the appended claims.

What we claim as new and desire to secure by Letters Patent of the United States is:

1. The process of making 2,6-dialkylphenols which comprises reacting an aldehyde selected from the group consisting of formaldehyde and acetaldehyde with a ketone selected from the group consisting of cyclohexanone and 2-methylcyclohexanone in the vapor phase at a temperature of from 200° to 800° C.

2. The process of claim 1 wherein the reaction is carried out in the presence of an inorganic solid which is thermally stable at the temperature of the reaction.

3. The process of claim 1 wherein the reaction is carried out in the presence of an inorganic solid selected from the group consisting of the phosphates, oxides and silicates of calcium, zinc, magnesium and aluminum.

4. The process of claim 1 wheren the reaction is carried out in the presence of a solid comprising calcium phosphate.

5. The process of claim 1 wherein the reaction is carried out in the presence of a solid comprising a mixture of calcium phosphate and animal charcoal.

6. The process of making 2,6-dimethylphenol which comprises reacting formaldehyde with cyclohexanone in the vapor phase at a temperature of from 200° to 800° C.

7. The process of claim 6 wherein the reaction is carried out in the presence of an inorganic solid which is thermally stable at the temperature of reaction.

8. The process of claim 6 wherein the reaction is carried out in the presence of an inorganic solid selected from the group consisting of the phosphates, oxides and silicates of calcium, zinc, magnesium and aluminum.

9. The process of claim 6 wherein the reaction is carried out in the presence of a solid comprising calcium phosphate.

10. The process of claim 6 wherein the reaction is carried out in the presence of a solid comprising a mixture of calcium phosphate and animal charcoal.

11. The process of making 2,6-diethylphenol which comprises reacting acetaldehyde with cyclohexanone in the vapor phase at a temperature of from 200° to 800° C.

12. The process of claim 11 wherein the reaction is carried out in the presence of an inorganic solid which is thermally stable at the temperature of the reaction.

13. The process of claim 11 wherein the reaction is carried out in the presence of an inorganic solid selected from the group consisting of the phosphates, oxides and silicates of calcium, zinc, magnesium and aluminum.

14. The process of claim 11 wherein the reaction is carried out in the presence of a solid comprising calcium phosphate.

15. The process of claim 11 wherein the reaction is carried out in the presence of a solid comprising a mixture of calcium phosphate and animal charcoal.

16. The process of making 2,6-dimethylphenol which comprises reacting formaldehyde with 2-methylcyclohexanone in the vapor phase at a temperature of from 200° to 800° C.

17. The process of claim 16 wherein the reaction is carried out in the presence of an inorganic solid which is thermally stable at the temperature of the reaction.

18. The process of claim 16 wherein the reaction is carried out in the presence of an inorganic solid selected from the group consisting of the phosphates, oxides and silicates of calcium, zinc, magnesium and aluminum.

19. The process of claim 16 wherein the reaction is carried out in the presence of a solid comprising calcium phosphate.

20. The process of claim 16 wherein the reaction is carried out in the presence of a solid comprising a mixture of calcium phosphate and animal charcoal.

References Cited by the Examiner

UNITED STATES PATENTS 2,369,196 2/1945 Williams et al. _____ 260—621

FOREIGN PATENTS 255,127 7/1926 Great Britain.

OTHER REFERENCES

Walker: "Formaldehyde" (2nd ed., 1953), page 159.

LEON ZITVER, *Primary Examiner.*

HAROLD G. MOORE, *Examiner.*

D. M. HELFER, *Assistant Examiner.*